United States Patent
Kuroiwa et al.

(10) Patent No.: US 7,299,268 B2
(45) Date of Patent: Nov. 20, 2007

(54) SYSTEM FOR INSERTION AND OUTPUT OF A SECOND ELECTRONIC MATERIAL BASED ON A FIRST ELECTRONIC MATERIAL

(75) Inventors: Sogo Kuroiwa, Kanagawa (JP); Junichi Kamijima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 663 days.

(21) Appl. No.: 09/971,036

(22) Filed: Oct. 5, 2001

(65) Prior Publication Data

US 2002/0046242 A1   Apr. 18, 2002

(30) Foreign Application Priority Data

Oct. 13, 2000   (JP)   ............................. 2000-313966

(51) Int. Cl.
    *G06F 15/16*   (2006.01)
(52) U.S. Cl. ........................................ 709/217; 709/203
(58) Field of Classification Search ........ 709/201–205, 709/227, 225, 229, 217, 218, 223, 231, 246; 705/14, 25, 26; 715/700; 345/769, 619; 455/552; 725/37, 109, 116
    See application file for complete search history.

(56) References Cited

U.S. PATENT DOCUMENTS

| | | | | |
|---|---|---|---|---|
| 5,933,811 | A * | 8/1999 | Angles et al. ................. | 705/14 |
| 6,009,410 | A * | 12/1999 | LeMole et al. ................ | 705/14 |
| 6,029,195 | A * | 2/2000 | Herz .......................... | 725/116 |
| 6,061,716 | A * | 5/2000 | Moncreiff .................... | 709/204 |
| 6,105,055 | A * | 8/2000 | Pizano et al. ................ | 709/204 |
| 6,111,586 | A * | 8/2000 | Ikeda et al. .................. | 345/619 |
| 6,151,621 | A * | 11/2000 | Colyer et al. ................ | 709/204 |
| 6,154,755 | A * | 11/2000 | Dellert et al. ............... | 715/526 |
| 6,205,432 | B1 * | 3/2001 | Gabbard et al. .............. | 705/14 |
| 6,311,214 | B1 * | 10/2001 | Rhoads ....................... | 709/217 |
| 6,338,044 | B1 * | 1/2002 | Cook et al. .................. | 705/14 |
| 6,357,042 | B2 * | 3/2002 | Srinivasan et al. ........... | 725/32 |
| 6,389,467 | B1 * | 5/2002 | Eyal .......................... | 709/223 |
| 6,446,261 | B1 * | 9/2002 | Rosser ........................ | 725/34 |

(Continued)

FOREIGN PATENT DOCUMENTS

EP     0 525 947 A1 *   5/1992

OTHER PUBLICATIONS

Texture Orientation for Sorting Photos "at a Glance"—Gorkani, Picard (1994) www-white.media.mit.edu/vismod/publications/techdir/TR-292.ps.Z.*

(Continued)

*Primary Examiner*—Thong Vu
(74) *Attorney, Agent, or Firm*—Fitzpatrick, Cella, Harper & Scinto

(57) ABSTRACT

The invention provides an information processing terminal capable of being connected to a network. The terminal comprises a receiving unit for receiving information of first electronic materials transmitted from an electronic materials providing side, an advertisement information preparing unit for preparing information of second electronic materials, with which advertisement information is associated, based on the information of the first electronic materials received by the information receiving unit, and a transmitting unit for transmitting, to the electronic materials providing side, the information of the second electronic materials, with which the advertisement information prepared by the advertisement information preparing unit is associated.

3 Claims, 12 Drawing Sheets

U.S. PATENT DOCUMENTS

| | | | | |
|---|---|---|---|---|
| 6,487,541 B1 * | 11/2002 | Aggarwal et al. | ............. | 705/26 |
| 6,487,583 B1 * | 11/2002 | Harvey et al. | ............... | 709/204 |
| 6,496,802 B1 * | 12/2002 | van Zoest et al. | ............ | 705/14 |
| 6,496,803 B1 * | 12/2002 | Seet et al. | ..................... | 705/14 |
| 6,509,910 B1 * | 1/2003 | Agarwal et al. | ............. | 715/752 |
| 6,549,295 B1 * | 4/2003 | Fantone et al. | ............. | 358/1.14 |
| 6,587,839 B1 * | 7/2003 | McIntyre et al. | ............. | 705/27 |
| 6,628,899 B1 * | 9/2003 | Kito | ............................. | 396/56 |
| 6,725,203 B1 * | 4/2004 | Seet et al. | ..................... | 705/14 |
| 6,891,567 B2 * | 5/2005 | Steinberg | ............... | 348/211.99 |
| 7,047,033 B2 * | 5/2006 | Wyler | ...................... | 455/552.1 |
| 7,146,398 B2 * | 12/2006 | Kuroiwa et al. | ............. | 709/203 |
| 2001/0029465 A1 * | 10/2001 | Strisower | ...................... | 705/14 |
| 2001/0034646 A1 * | 10/2001 | Hoyt et al. | .................... | 705/14 |
| 2001/0034654 A1 * | 10/2001 | Vigil et al. | .................... | 705/14 |
| 2001/0037241 A1 * | 11/2001 | Puri | ............................ | 705/14 |
| 2001/0049635 A1 * | 12/2001 | Chung | ......................... | 705/26 |
| 2001/0049824 A1 * | 12/2001 | Baker et al. | ................ | 725/109 |
| 2002/0010758 A1 * | 1/2002 | Chan | ........................... | 709/218 |
| 2002/0040374 A1 * | 4/2002 | Kent | ........................... | 707/516 |
| 2002/0046089 A1 * | 4/2002 | Zorn | ........................... | 705/14 |
| 2002/0047856 A1 * | 4/2002 | Baker | ......................... | 345/700 |
| 2002/0052925 A1 * | 5/2002 | Kim et al. | .................... | 709/217 |
| 2002/0062393 A1 * | 5/2002 | Borger et al. | ................ | 709/246 |
| 2002/0063901 A1 * | 5/2002 | Hicks | ......................... | 358/302 |
| 2002/0092019 A1 * | 7/2002 | Marcus | ........................ | 725/37 |
| 2002/0094189 A1 * | 7/2002 | Navab et al. | ................... | 386/4 |
| 2003/0115286 A1 * | 6/2003 | Mayle et al. | ................ | 709/217 |
| 2004/0008226 A1 * | 1/2004 | Manolis et al. | ............. | 345/769 |
| 2004/0098449 A1 * | 5/2004 | Bar-Lavi et al. | ............. | 709/202 |
| 2004/0177114 A1 * | 9/2004 | Friedman et al. | ........... | 709/203 |
| 2005/0188058 A1 * | 8/2005 | Inoue | ......................... | 709/219 |
| 2005/0210145 A1 * | 9/2005 | Kim et al. | ................... | 709/231 |
| 2006/0282544 A1 * | 12/2006 | Monteiro et al. | ........... | 709/231 |

OTHER PUBLICATIONS

Reactive Memories: An Interactive—Talking-Head Vincent Devin (2001) www.bmva.ac.uk/bmvc/2001/papers/82/../../papers/5/accepted_5.pdf.*

U.S. Appl. No. 09/971,037, filed Oct. 5, 2001.

* cited by examiner

SYSTEM FOR INSERTION AND OUTPUT OF A SECOND ELECTRONIC MATERIAL BASED ON A FIRST ELECTRONIC MATERIAL

BACKGROUND OF THE INVENTION

1. Field of the Invention

The present invention relates to an information processing apparatus which is suitable for providing an efficient and effective advertising method when advertisements are given to the public through the Internet, and which is also suitable for creating common electronic materials inexpensively.

2. Description of the Related Art

Hitherto, when an event, such as a trip or tour, takes place, an album has often been created using photos taken in the event. Particularly, when a group of plural friends or acquaintances make an event, such as a trip or tour, they want a photo album as a memory of the event. In such a case, one album has sometimes been created using photos taken by different participants.

However, in the case of creating an album using photos taken by different participants, when a group of plural friends or acquaintances make an event, such as a trip or tour, the following problem occurs. After the event, those participants must arrange their schedules to meet at a certain place and bring there the photos taken by them. This has been very troublesome.

Also, another problem occurs when the participants are living in remote districts and gather only for the purpose of an event. Because they are remote from one another, it has been very difficult to create the above-mentioned album.

SUMMARY OF THE INVENTION

Accordingly, it is an object of the present invention to provide an information processing apparatus which is suitable for realizing an efficient and effective advertising method when advertisements are given to the public through the Internet, and which is also suitable for creating common electronic materials inexpensively.

An information processing apparatus of the present invention according to a first aspect is constructed as follows.

In an information processing apparatus capable of being connected to a network, the apparatus comprises a storage unit for receiving information of first electronic materials input from a terminal on an electronic-materials creating user side, and storing the received information of the first electronic materials; an information transmitting unit for transmitting the information of the first electronic materials stored in the storage unit to a terminal on an advertisement providing side; an information receiving unit for, after transmitting the information of the first electronic materials from the information transmitting unit, receiving information of second electronic materials, which is transmitted from the advertisement providing side and with which advertisement information is associated based on the information of the first electronic materials; and an advertisement materials publicizing unit for, in response to a request from an electronic-materials service receiving side, transmitting the information of the second electronic materials received by the information receiving unit to the electronic-materials service receiving side.

An information processing apparatus of the present invention according to a second aspect is constructed as follows.

In an information processing terminal capable of being connected to a network, the terminal comprising a receiving unit for receiving information of first electronic materials transmitted from an electronic materials providing side; an advertisement information preparing unit for preparing information of second electronic materials, with which advertisement information is associated, based on the information of the first electronic materials received by the information receiving unit; and a transmitting unit for transmitting, to the electronic materials providing side, the information of the second electronic materials, with which the advertisement information prepared by the advertisement information preparing unit is associated.

An information processing method of the present invention according to a first aspect is constructed as follows.

In an information processing method for providing, via a network, electronic materials in which an advertisement is inserted, the method comprises the steps of receiving information of first electronic materials input from a terminal on an electronic-materials creating user side; storing the received information of the first electronic materials; transmitting the stored information of the first electronic materials to a terminal on an advertisement providing side; after transmitting the information of the first electronic materials, receiving information of second electronic materials, which is transmitted from the advertisement providing side and with which advertisement information is associated based on the information of the first electronic materials; and in response to a request from an electronic-materials service receiving side, transmitting the received information of the second electronic materials to the electronic-materials service receiving side.

An information processing method of the present invention according to a second aspect is constructed as follows.

In an information processing method for providing, via a network, electronic materials in which an advertisement is inserted, the method comprises the steps of receiving information of first electronic materials transmitted from an electronic materials providing side; preparing information of second electronic materials, with which advertisement information is associated, based on the received information of the first electronic materials; and transmitting, to the electronic materials providing side, the information of the second electronic materials, with which the prepared advertisement information is associated.

An information processing system of the present invention is constructed as follows.

An information processing system connecting, via a network, a first terminal on an electronic-materials creating user side and a second terminal on an advertisement providing side for inserting an advertisement in electronic materials, the system comprises a storage unit for receiving information of first electronic materials input from the first terminal on the electronic-materials creating user side, and storing the received information of the first electronic materials; an information transmitting unit for transmitting the information of the first electronic materials stored in the storage unit to the second terminal on the advertisement providing side; an information receiving unit for, after transmitting the information of the first electronic materials from the information transmitting unit, receiving information of second electronic materials, which is transmitted from the second terminal on the advertisement providing side and with which advertisement information is associated based on the information of the first electronic materials; and an advertisement materials publicizing unit for, in response to a request from a third terminal on an electronic-materials service receiving side, transmitting the information of the second electronic materials received by the information receiving unit to the electronic-materials service receiving side.

A program of the present invention according to a first aspect is constructed as follows.

The program operates on an information processing apparatus, capable of being connected to a network, to execute the steps of receiving information of first electronic materials input from a terminal on an electronic-materials creating user side, and storing the received information of the first electronic materials; an information transmitting step for transmitting the information of the first electronic materials stored in the storing step to a terminal on an advertisement providing side; an information receiving step for, after transmitting the information of the first electronic materials in the information transmitting step, receiving information of second electronic materials, which is transmitted from the advertisement providing side and with which advertisement information is associated based on the information of the first electronic materials; and an advertisement materials publicizing step for, in response to a request from an electronic-materials service receiving side, transmitting the information of the second electronic materials received in the information receiving step to the electronic-materials service receiving side.

A program of the present invention according to a second aspect is constructed as follows.

The program operates on an information processing terminal, capable of being connected to a network, to execute the steps of a receiving step for receiving information of first electronic materials transmitted from an electronic materials providing side; an advertisement information preparing step for preparing information of second electronic materials, with which advertisement information is associated, based on the information of the first electronic materials received in the information receiving step; and a transmitting step for transmitting, to the electronic materials providing side, the information of the second electronic materials, with which the advertisement information prepared in the advertisement information preparing step is associated.

Other features and advantages of the present invention will apparent from the following description in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

One embodiment of the present invention will be described below with reference to the drawings.

Figure 1:
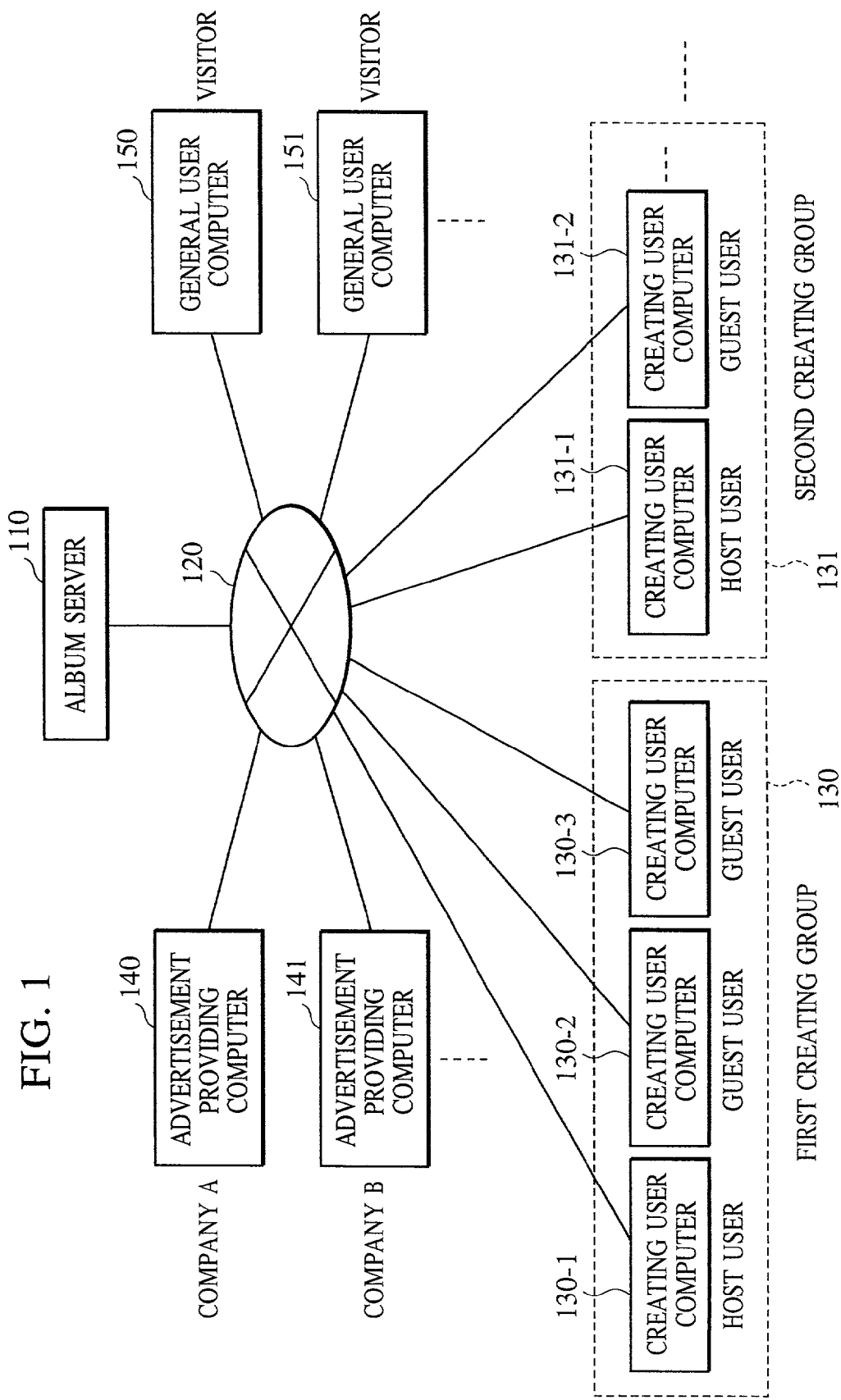
FIG. 1 is a block diagram showing one example of configuration of an electronic album creating system to which an information processing apparatus according to an embodiment of the present invention is applied.

FIG. 1 is a block diagram showing one example of configuration of an electronic album creating system to which an information processing apparatus according to this is applied.

Referring to FIG. 1, numeral 110 denotes an album server for creating an electronic album. The album server 110 provides a template for creating an electronic album to (album) creating user computers 130-1, 130-2, 130-3, 131-1, 131-2, etc., and inputs, in the template, image data and comment data transmitted from the creating user computers 130-1 to 130-3, 131-1, 131-2, etc.

Also, the album server 110 provides album data of the electronic album, in which the image data and the comment data have been input, to general user computers 150, 151, etc. Further, the album server 110 processes the album data of the electronic album to prepare processed album data for the purpose of soliciting advertisements to be inserted in the electronic album. In addition, the album server 110 provides the processed album data to advertisement providing computers 140, 141, etc.

The creating user computers 130-1 to 130-3, 131-1, 131-2, etc. receive, e.g., a template for creating an electronic album, which is provided from the album server 110, and transmit image data and comment data, which are to be input in the template, to the album server 110.

Also, the creating user computers 130-1 to 130-3 constitute a first creating group 130, and the creating user computers 131-1, 131-2, etc. constitute a second creating group 131. The "creating group" used herein means a user group comprising a plurality of creating user computers that take part in creating one electronic album.

The creating group comprises one creating user computer operated by a host user, and one or more creating user computers operated by guest users. The host user selects category information provided from the album server 110, and inputs user information regarding the users of the relevant creating group. Also, the guest users are users registered by the host user.

The advertisement providing computers 140, 141, etc. receive the processed album data prepared by processing the album data of the electronic album, which is provided from the album server 110, for inserting an advertisement in the electronic album. The general user computers 150, 151, etc. receive the album data of the electronic album, in which the image data and the comment data have been input, provided from the album server 110.

The album server 110, the creating user computers 130-1 to 130-3, 131-1, 131-2, etc., the advertisement providing computers 140, 141, etc., and the general user computers 150, 151, etc. are interconnected for mutual communications. Thus, those components are interconnected through network interfaces (described later), provided in themselves, to be able to communicate with one another via a network 120 such as the Internet or WAN (Wide Area Network).

Figure 2:
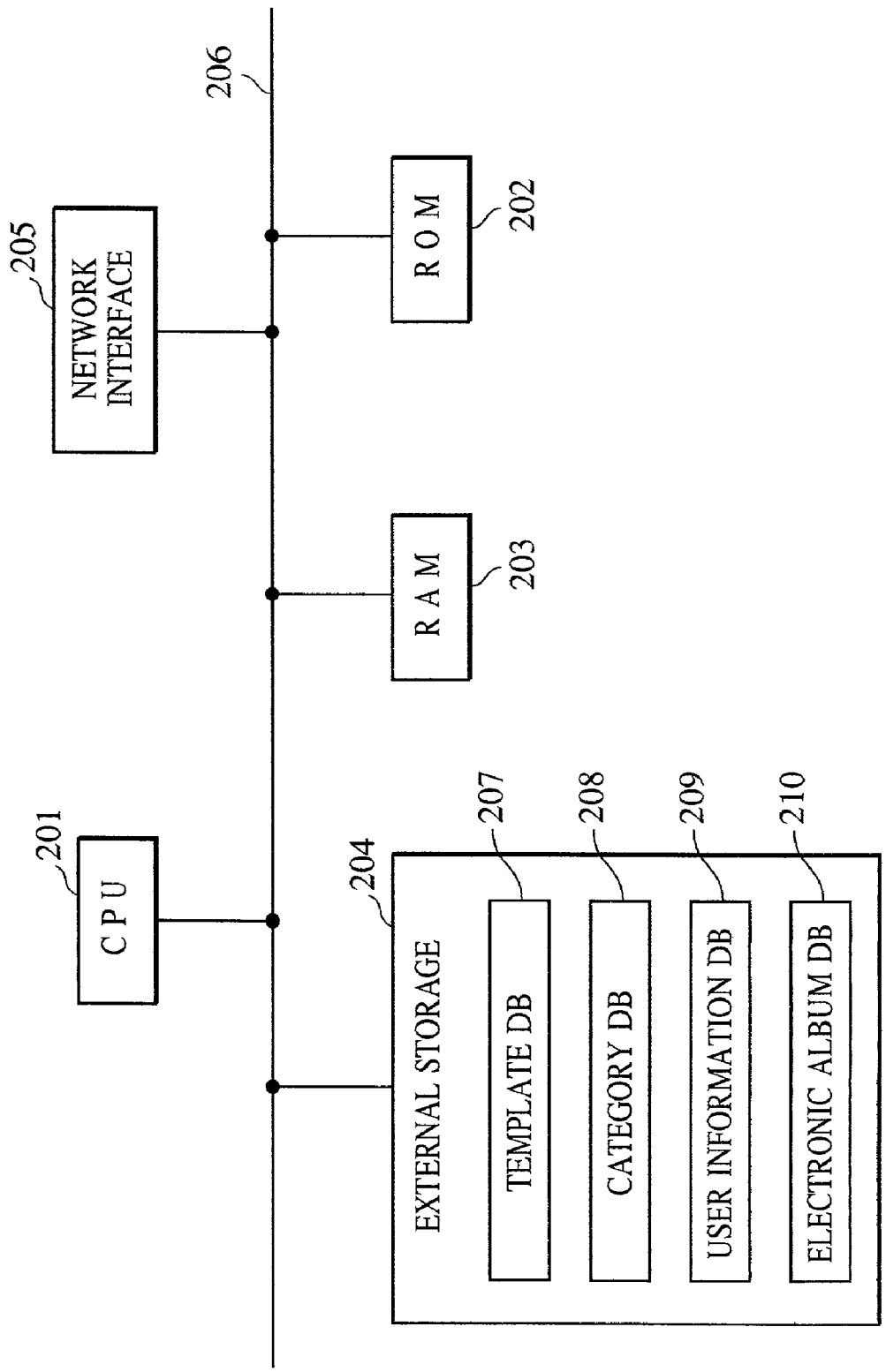
FIG. 2 is a block diagram showing one example of hardware configuration of an album server.

FIG. 2 is a block diagram showing one example of hardware configuration of the album server 110 in this embodiment.

Referring to FIG. 2, numeral 201 denotes a CPU for controlling various components connected to the CPU via a bus 206 so as to transmit, receive and merge data. Via the bus 206, address signals, control signals and various data are transferred between the various components (pieces of equipment) interconnected by the bus 206.

Numeral 202 denotes a ROM (Read Only Memory). Control procedures (computer programs) for the CPU 201 are stored in the ROM 202 beforehand. Processing, such as transfer and merging of data, can be performed by the CPU 201 executing the control procedures. Numeral 203 denotes a RAM serving as a work memory for transmitting, receiving and merging data, and also as a temporary memory for control of the various components.

In this embodiment, the CPU 201, the ROM 202, the RAM 203, etc. realize the functions of a user information receiving unit, a template information providing unit, a creation information receiving unit, an album editing unit, a communication mediating unit, etc. used in the present invention.

Numeral 204 denotes an external storage for storing data, such as a hard disk. The external storage 204 stores a template database (DB) 207, a category database (DB) 208, a user information database (DB) 209, and an electronic album database (DB) 210.

The template DB 207 stores templates for creating electronic albums. The category DB 208 stores album classifying information for classifying electronic albums in accordance with predetermined classes. The album classifying information includes category information prepared by the album server 110 and theme information input from the host user through the creating user computer and assigned to the electronic album.

The user information DB 209 registers and stores user information regarding the host user and the guest users, which is input from the host user through the creating user computer. In other words, the user information DB 209 registers and stores user information regarding the users of the creating groups. The electronic album DB 210 stores album data of electronic albums, processed album data, and advertisement album data. The advertisement album data means a combination of album data of an electronic album and advertisement data to be inserted in the electronic album.

Numeral 205 denotes a network interface for connection between the album server 110 and the network 120.

Figure 3:
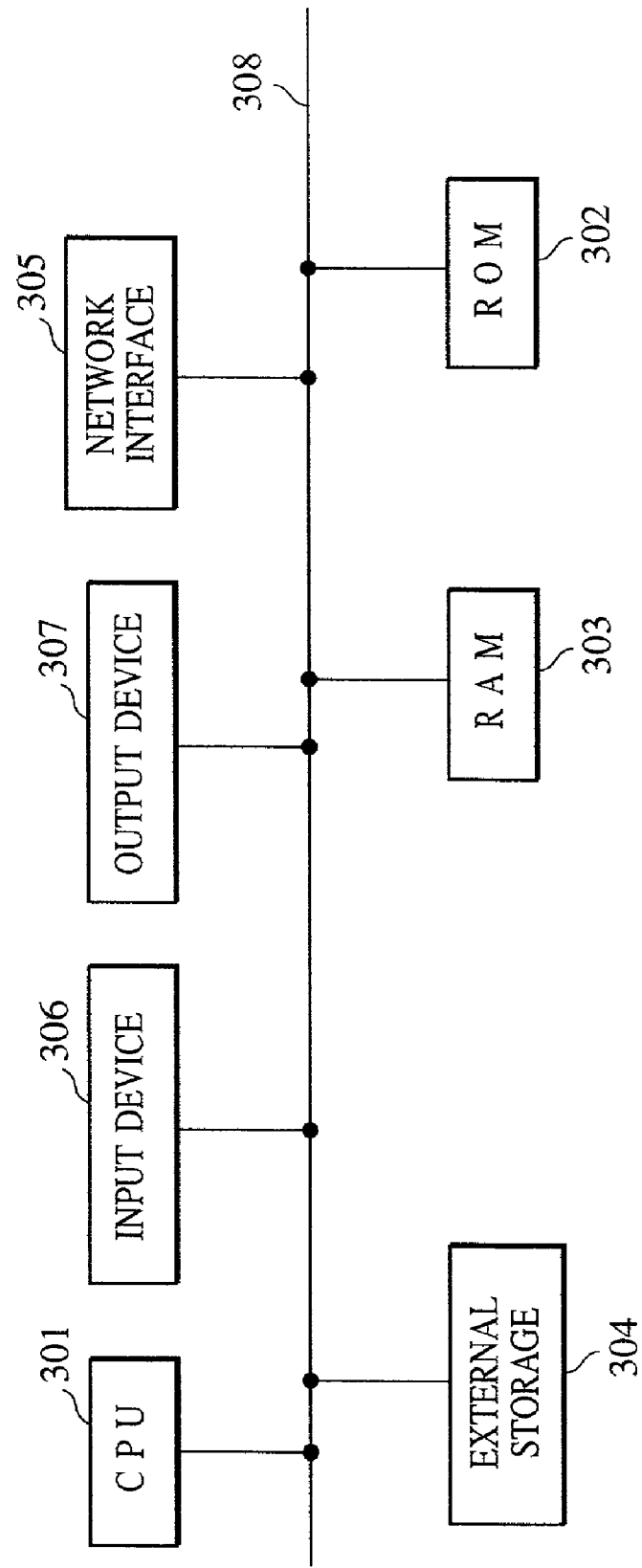
FIG. 3 is a block diagram showing one example of hardware configuration of a creating user computer.

FIG. 3 is a block diagram showing one example of hardware configuration of the creating user computer 130-1 in this embodiment.

Referring to FIG. 3, numeral 301 denotes a CPU. The CPU 301 controls various components connected to it via a bus 308 for, e.g., inputting and outputting data and transmitting and receiving data. Via the bus 308, address signals, control signals and various data are transferred between the various components (pieces of equipment) interconnected by the bus 308.

Numeral 302 denotes a ROM (Read Only Memory). Control procedures (computer programs) for the CPU 301 are stored in the ROM 302 beforehand. Processing, such as to input and output data and transmit and receive data, can be performed by the CPU 301 executing the control procedures. Numeral 303 denotes a RAM. The RAM 303 serves as a work memory for inputting, outputting, transmitting and receiving data, and also as a temporary memory for control of the various components. In this embodiment, the CPU 301, the ROM 302, the RAM 303 and so on realize the functions of a user information transmitting unit, a template information acquiring unit, a created information transmitting unit, etc. used in the present invention.

Numeral 304 denotes an external storage for storing data, such as a hard disk. Numeral 305 denotes a network interface for connection between the creating user computer 130-1 and the network 120. Numeral 306 denotes an input device such as a keyboard, a mouse and a digital camera. The input device 306 is employed to select the category information provided from the album server 110, or to input image data and comment data. Numeral 307 denotes an output device, such as a display, which is employed to display various input data on a screen.

The other creating user computers 130-2, 130-3, 131-1, 131-2, etc., the advertisement providing computers 140, 141, etc., and the general user computers 150, 151, etc. are each of the same hardware configuration of the creating user computer 130-1. Hence, a detailed description of those computers is omitted here.

The operation will be described below with reference to FIGS. 4 to 12.

The following description is made in connection with the case where the users of the first creating group 130, which comprises the creating user computers 130-1 to 130-3 shown in FIG. 1, create an electronic album. Also, it is assumed that the user operating the creating user computer 130-1 is a host user and the users operating the creating user computers 130-2, 130-3 are guest users. (Initial Setting Process)

Figure 4:
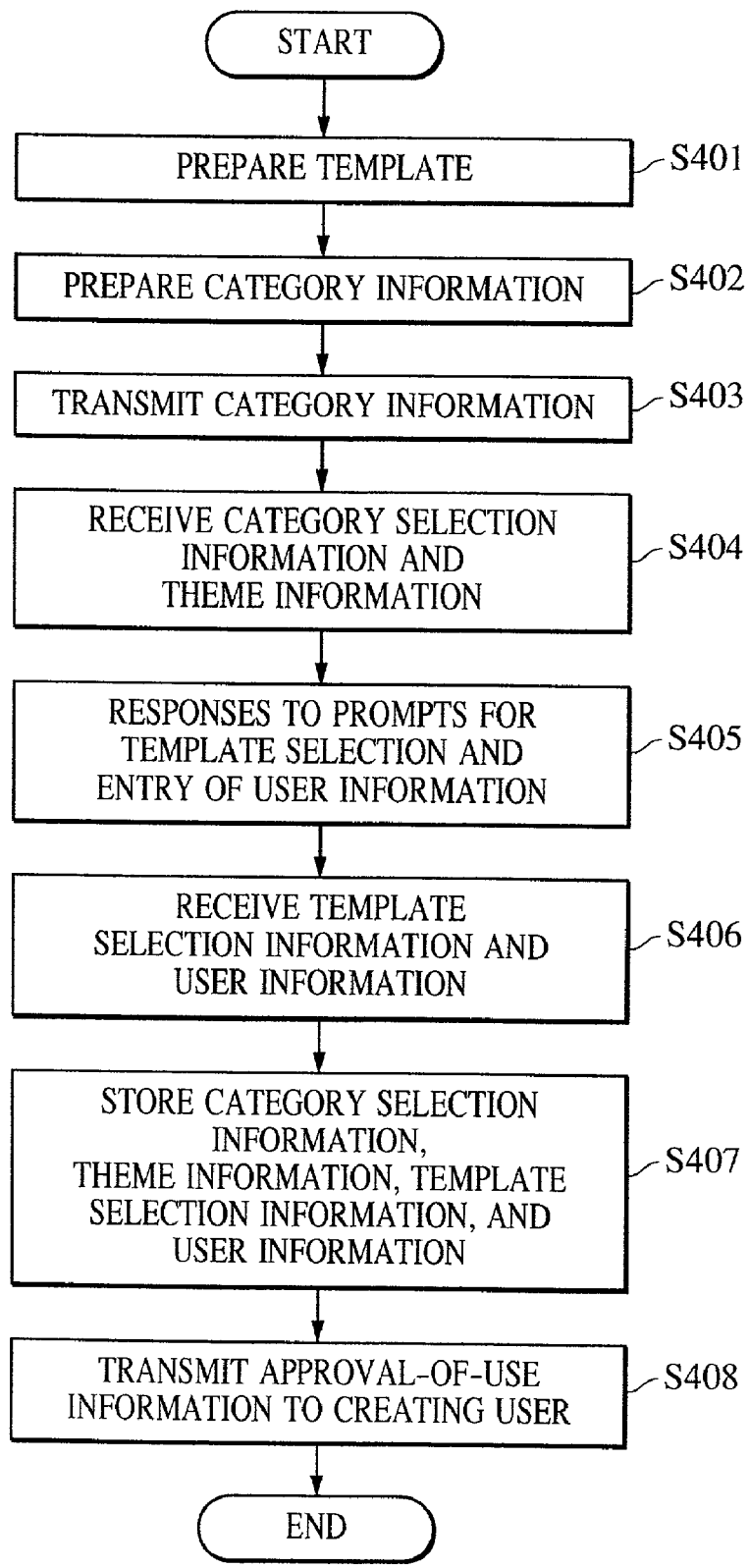
FIG. 4 is a flowchart showing the operation of an initial setting process for creating an electronic album, including setting of category information and user information.

FIG. 4 is a flowchart showing the operation of an initial setting process for creating an electronic album, including setting of category information and user information. FIG. 4 represents the operation on the side of the album server 110.

Figure 10:
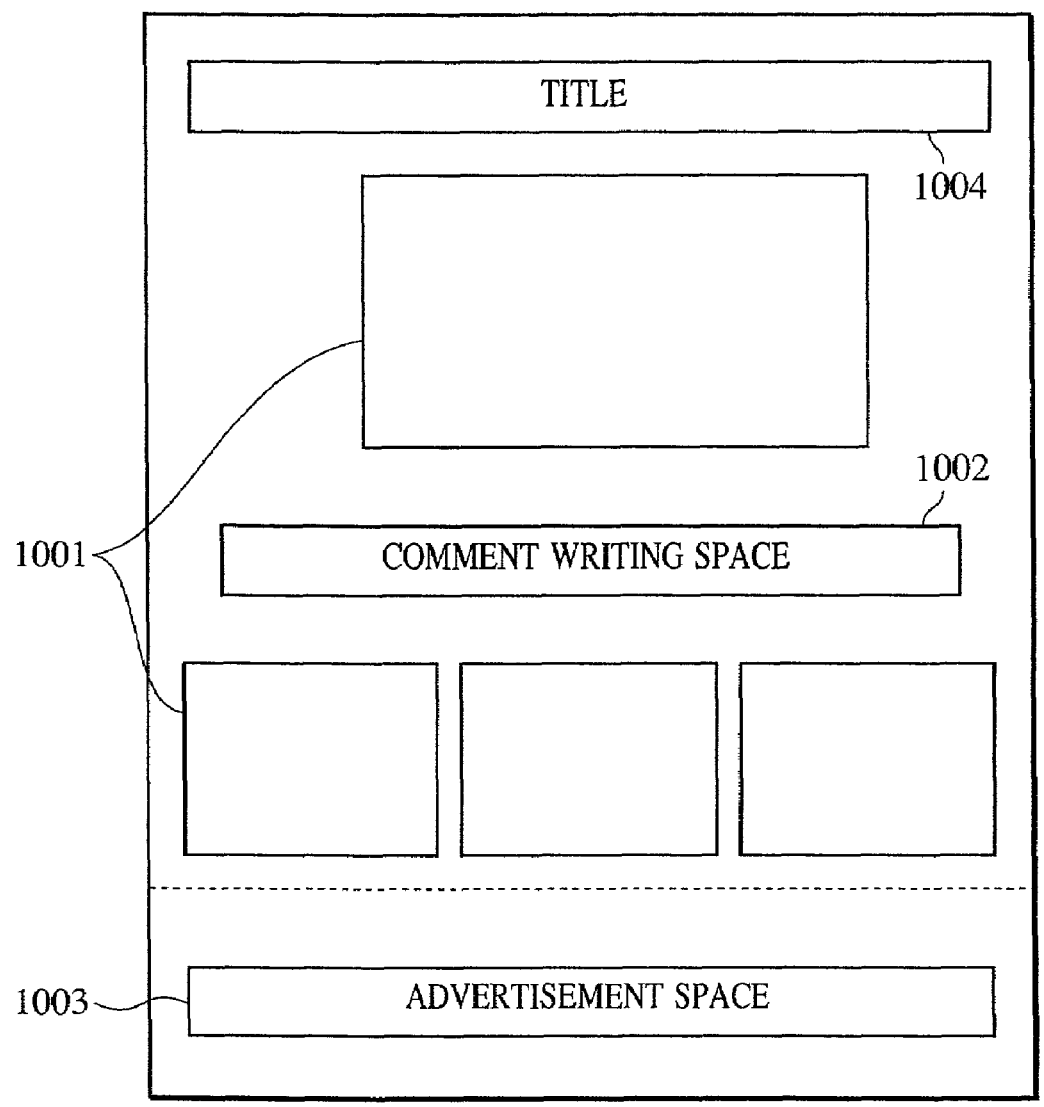
FIG. 10 is a representation showing a template.

First, the album server 110 prepares a template for creating an electronic album and stores the template in the template DB 207 (step S401). FIG. 10 shows one example of the template. As shown in FIG. 10, the template is made up of an image entry area 1001 in which data of images, such as photos, is to be input, text entry areas 1002, 1004 in which data of comments, such as impressions, is to be input, an advertisement entry area in which advertisement data is to be input, etc. The text entry areas include a title entry area 1004 in which a title of an electronic album is to be input, and a comment entry area 1002 in which comments (compositions) freely written by the user are to be input. Additionally, the template is prepared in plural number for each item of category information.

Then, in step S402, the album server 110 prepares category information for classifying electronic albums in accordance with predetermined classes, and stores the category information in the category DB 208. The category information includes, e.g., items such as "travel" and "food". Further, the category information "travel", for example, may be divided into sub-category information classified for each destination of travel, such as "Tahiti", "Maldives" or "Canada".

Then, the album server 110 starts a procedure for making a Web site available for general use, on which electronic albums are created and made open to the public. That procedure is performed after preparing the template (step S401) and preparing the category information (step S402).

The template and the category information may be added and deleted, as required, after making the Web site available for general use.

Figure 11:
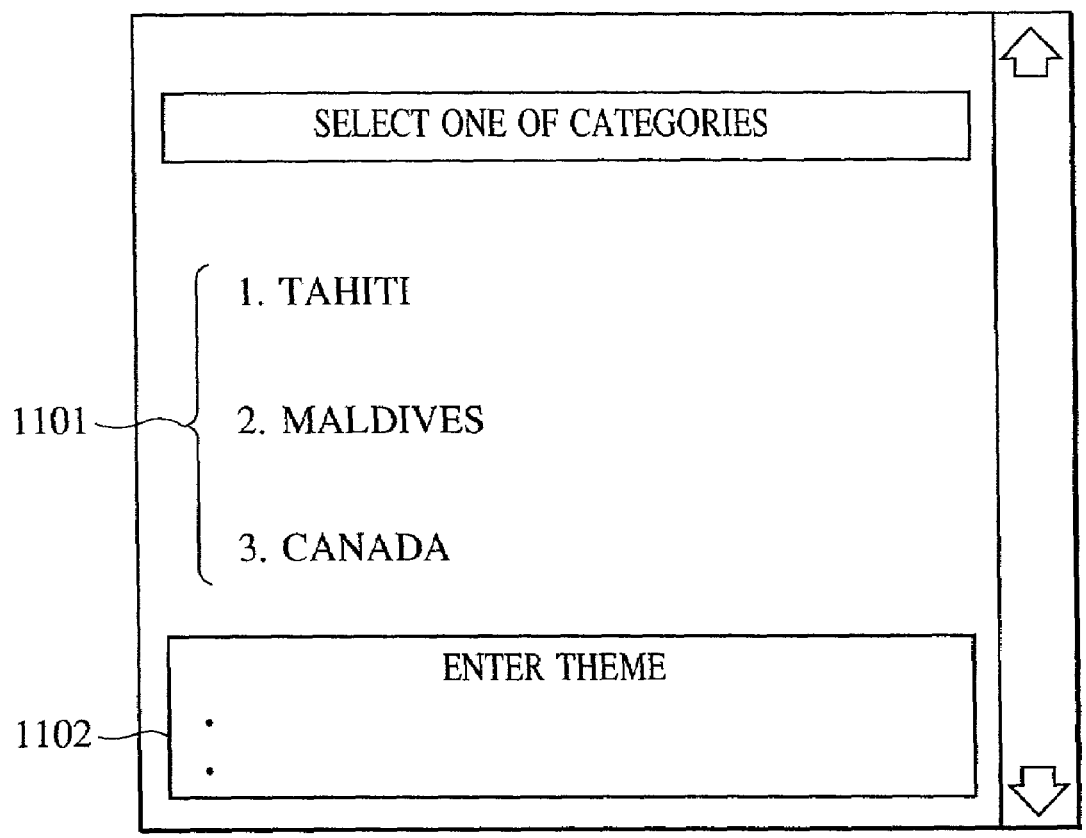
FIG. 11 is a representation showing a screen for prompting selection of the category information.

Subsequently, it is assumed that the creating user computer 130-1 accesses the Web site and notifies the intent of creating an electronic album to the album server 110. In such a case, in step S403, the album server 110 prompts selection of the category information. This prompt is performed by transmitting data for displaying the category information stored in the category DB 208 on the output device 307 of the creating user computer 130-1. Note that, in this specification, data displayed on the output device on the user side is expressed by "display data". Upon receiving the display data, the creating user computer 130-1 displays an image, such as shown in FIG. 11, on the display screen. As seen from FIG. 11, category items 1101 are displayed.

Category selection information representing the selected category information and theme information input by the user are both transmitted to the album server 110. Those data are transmitted from the creating user computer 130-1 as a response to a prompt for selecting the category information and a prompt 1102 for inputting the theme information regarding the theme of an electronic album to be created. Upon receiving the category selection information and the theme information in step S404, the album server 110 goes to step S405.

Figure 12:
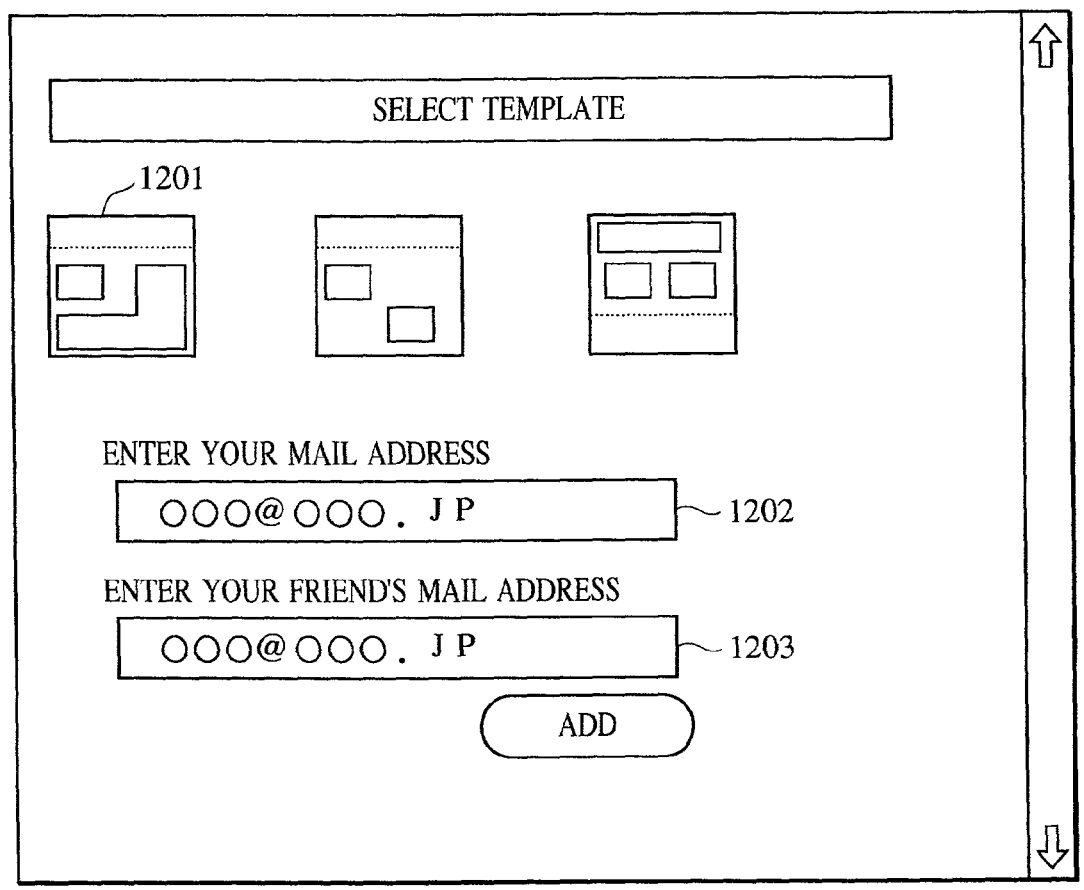
FIG. 12 is a representation showing a screen for prompting entry of the user information.

In step S405, the album server 110 transmits, to the creating user computer 130-1, display data for prompting the user to select one of the templates stored in the template DB 207. This step is responsive to the category selection information received in step S404. Also, the album server 110 prompts entry of the user information. This prompt is performed by transmitting, to the creating user computer 130-1, display data for displaying a screen image to input the user information (such as the user names, passwords, and e-mail addresses) regarding users (album creating users) who participate in creating the electronic album. Correspondingly, the creating user computer 130-1 displays an image, such as shown in FIG. 12, on the display screen. In FIG. 12, numeral 1201 denotes a list of templates to be selected, and numeral 1202 denotes a column in which the mail address is to be entered as the user information. Also, numeral 1203 denotes a column in which the mail addresses of friends, who participate in creating the electronic album, are to be entered.

The column 1203 may be modified so as to request entry of the gender and ages of the album creating users as the user information. This is because the user information including the gender and ages represents personality of the album creating users. Such information may be available, for example, as marketing materials. In other words, such information may be useful in estimating what kinds of users having different personalities desire what categories of albums or travels.

Template selection information representing the selected template and the user information input by the user are both transmitted from the creating user computer 130-1 to the album server 110. Those data are transmitted as a response to prompts for selecting the template and inputting the user information. In step S406, the album server 110 receives the template selection information and the user information.

Then, in step S407, the album server 110 stores the category selection information and the theme information, received in step S404, in the category DB 208. Also, the album server 110 stores the template selection information and the user information, received in step S406, in the user information DB 209. At that time, the category selection information and the theme information, stored in the category DB 208, and the template selection information and the user information, stored in the user information DB 209, are stored as information regarding the first creating group 130 in a manner correlated to each other.

In step S408, the album server 110 transmits approval-of-use information permitting the use of the Web site to create an electronic album by an e-mail, for example, to the creating users of the electronic album, whose addresses are stored in the user information DB 209 in above step S407. The approval-of-use information includes the user name, password, URL (Uniform Resource Locator), etc.

More specifically, the approval-of-use information contains information needed for issuing (or obtaining) an approval of an access to the album server 110. The approval of an access to the album server 110 is given for each of a plurality of album creating user terminals. For example, when the approval-of-use information contains the user name, password and URL as mentioned above, different user names are defined for the individual album creating user terminals. Alternatively, different passwords may be defined for the individual album creating user terminals. The approval of an access is made individually for each of the plurality of album creating user terminals. Therefore, the album server 110 can discriminate the information (including the approval-of-use information) transmitted to it. Stated otherwise, the approval-of-use information enables the album server 110 to determine which one of the album creating user terminals has transmitted that approval-of-use information.

In this embodiment, the password and the URL are of the same data. Thus, the URL has the function of the password. Also, the URL contains an "address" on the Internet for accessing the selected template information. For example, when the category information is "travel" and the sub-category information is "Maldives", the URL contains an "address" for the corresponding template. Further, the URL contains an "address" for the electronic album under creation.

In addition, the URL contains a domain. The domain is expressed by, e.g., an Internet Protocol address (IP address) or alphabets corresponding to the IP address.

Figure 5:
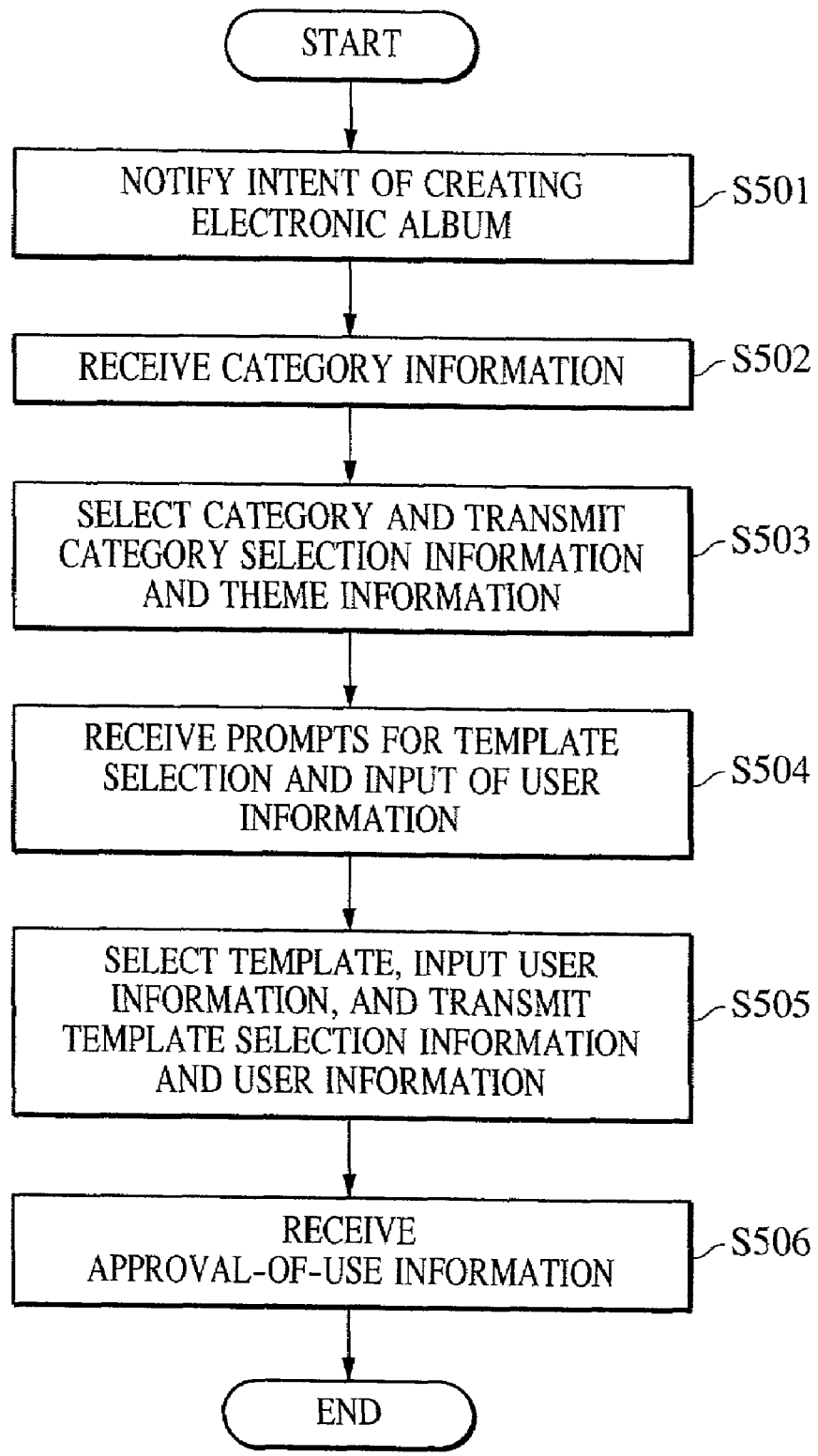
FIG. 5 is a flowchart showing the operation of an initial setting process for creating an electronic album, including setting of category information and user information.

FIG. 5 is a flowchart showing the operation of an initial setting process for creating an electronic album, including setting of category information and user information. FIG. 5 represents the operation on the side of the creating user computer 130-1.

First, the creating user computer 130-1 accesses the Web site provided by the album server 110 for creating an electronic album. Further, the creating user computer 130-1 notifies the intent of creating an electronic album to the album server 110 through the Web site (step S501).

In response to the notification, the album server 110 transmits the display data for selection of the category information and the display data for entry of the theme information to the creating user computer 130-1. Then, in step S402, the creating user computer 130-1 receives the display data for selection of the category information and the display data for entry of the theme information. As a result, the image shown in FIG. 11 is displayed on the display screen.

More specifically, in step S403, the creating user computer 130-1 displays, on the output device 307, a screen image based on the display data for selection of the category information and the display data for entry of the theme information. The screen image based on the display data for selection of the category information includes category selection buttons provided for each item of the category information for selecting the category information.

Using the input device 306 of the creating user computer 130-1, the host user clicks one of the category selection buttons and selects the category information. Also, the host user enters the theme information using the input device 306 of the creating user computer 130-1. Then, the creating user computer 130-1 transmits both the category selection information representing the selected category information and the entered theme information to the album server 110.

As a response to the transmitted category selection information, the creating user computer 130-1 receives in step S404, from the album server 110, the display data for selecting the template and the data for prompting entry of the user information regarding the creating users, i.e., the users of the creating user computers 130-1 to 130-3.

Based on the data received in step S404, the creating user computer 130-1 displays in step S509 a template selection screen and an entry screen for inputting the user information regarding the album creating users on the output device, as shown in FIG. 12. The template selection screen may be displayed as an entry screen including a plurality of templates displayed at the same time on one display screen. Alternatively, one template may be displayed on one display screen by providing a switching button or the like on a screen image and replacing the template with a next one each time the switching button is depressed.

The host user selects the template and enters the user information through the input device 306. Then, the creating user computer 130-1 transmits the template selection information representing the selected template and the entered user information to the album server 110. The user information contains the user names, passwords, e-mail addresses, etc. The user information may also contain the gender and ages of the creating users, as described above.

As a response to the template selection information and the user information both transmitted in step S505, the creating user computer 130-1 receives, in step S406, approval-of-use information transmitted from the album server 110. The user information received by the album server 110 also contains the mail addresses of users who participate in creating the electronic album together with the host user. Based on the user information, therefore, the approval-of-use information is transmitted from the album server 110 to each of the creating user computers 130-1 to 130-3 and is received by them.

The approval-of-use information contains, as described above, information enabling the album server 110 to determine which one of the album creating user terminals has transmitted the approval-of-use information. Hence, in an album creating process described below, the album server 110 can determine which one of the album creating user terminals has made an access to it.

(Album Creating Process)

Figure 6:
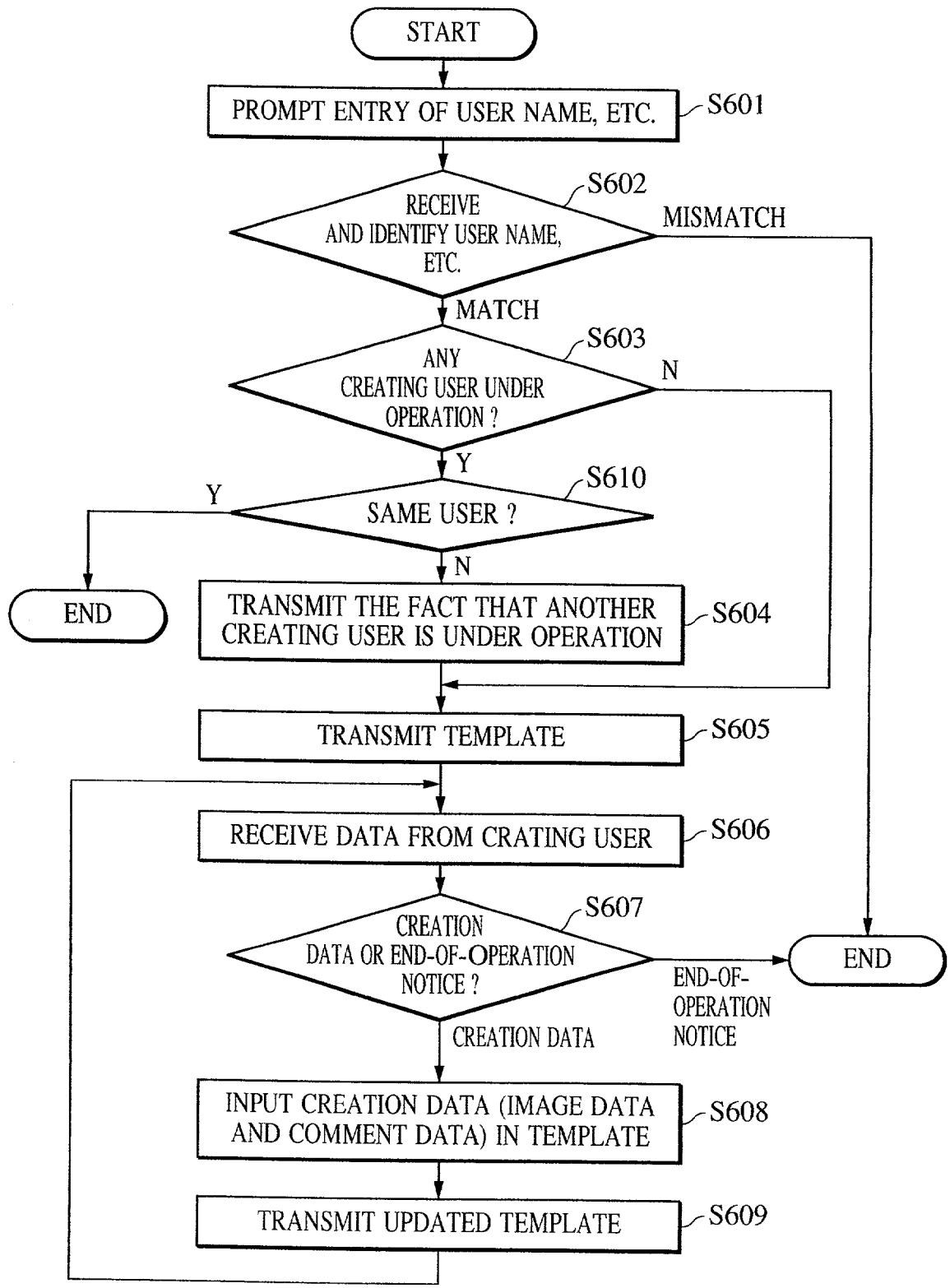
FIG. 6 is a flowchart showing the operation of an electronic album creating process by a creating user.

FIG. 6 is a flowchart showing the operation of an electronic album creating process by a creating user, looking from the album server side. FIG. 6 represents the operation on the side of the album server 110.

The album creating users, whose user information has been input in the initial setting process shown in FIGS. 4 and 5, access the Web site for creating the electronic album through the creating user computers 130-1 to 130-3, and notify the intent of creating the electronic album. At that time, the album server 110 transmits, to one of the creating user computers 130-1 to 130-3 who has accessed, display data for prompting entry of the user name and the URL as password (step S601).

In response to the prompt, the one user of the creating user computers 130-1 to 130-3 enters the user name and the URL as password by using the input device 306, followed by transmission.

In step S602, the album server 110 receives the user name and the URL as password transmitted from the one of the creating user computers 130-1 to 130-3. Then, the album server 110 checks and confirms whether the received user name and URL match with those ones registered in the user information DB 209. If the received user name and URL match with the registered ones, the control flow proceeds to step S603, and if not so, the album creating process is ended.

When the received user name and URL match with the registered ones and the control flow proceeds to step S603, the album server 110 checks whether any user of the first creating group 130, to which the user having the relevant user name belongs, is now creating the electronic album. If any user of the first creating group 130 is now creating the electronic album, the control flow proceeds to step S610.

In step S610, the album server 110 determines whether the same user has accessed. In this embodiment, different approval-of-use information is assigned to each album creating user. Then, the album server 110 does not transmit the template for creating the electronic album when access has already been made based on the same approval-of-use information.

More specifically, the URL serving also as a password contains the Internet address of the template selection information regarding the stored album. On the other hand, the user name is user information correlated to the URL (see step S407 in FIG. 4). Also, the user name is different for each user. Accordingly, when the album server 110 has already approved access based on the same name, it does not transmit the template for creating the electronic album to the user having the same name. In other words, when access to the album server is already permitted based on certain approval-of-use information, another access to the album server based on the same approval-of-use information is prohibited.

The approval-of-use information for permitting access to the album server contains a user name and a password. In this embodiment, a different user name is defined for each of album creating users. Alternatively, different passwords may be defined for individual users. This case will make the user free from troublesome operation of inputting the user name.

If it is determined in step S610 that the access is not from the same user, the control flow proceeds to step S604. In step S604, the album server 110 transmits the fact that another album creating user is under the operation, to the one of the creating user computers 130-1 to 130-3 that has accessed in step S601. Then, the album server 110 goes to step S605.

On that occasion, the album server 110 transmits, to the creating user computers 130-1 to 130-3, display data for a communication screen enabling the relevant users of the creating user computers 130-1 to 130-3 to make a chat or the like between or among them, and thereafter transmits communication information, which is input from any of the creating user computers 130-1 to 130-3, to all of the creating user computers 130-1 to 130-3.

If any other album creating user of the first creating group 130 is not under the operation of creating the electronic album, the control flow proceeds to step S605.

In step S605, the album server 110 transmits the display data for the template for creating an electronic album, such as shown in FIG. 10, to the one of the creating user computers 130-1 to 130-3 that has accessed in step S601. The template display data causes the whole of a template, including an image entry area and a text entry area, to be displayed on the output device 307 of the one of the creating user computers 130-1 to 130-3 so that the relevant user may create the electronic album. As another example, in response to a request from the relevant user of the creating user computers 130-1 to 130-3, the album server 110 may transmit the template display data for displaying only an image entry area or a text entry area.

When the operation of creating an electronic album is performed for the first time by the first creating group 130, the display data for the template selected in the initial setting process, shown in FIGS. 4 and 5, is transmitted as the template display data. That is, the display data for the template, in which neither images nor comments are entered, is transmitted.

When the operation of creating an electronic album has been performed before by the first creating group 130 and the user is going to edit the electronic album, the display data for the template, for which the operation of creating the electronic album has been performed before by the first creating group 130, is transmitted as the template display data. That is, the display data for the template, in which at least part of image data and comment data has already been entered, is transmitted.

Subsequently, in step S606, the album server 110 receives the data transmitted from the one of the creating user computers 130-1 to 130-3. Then, the album server 110 goes to step S607. In step S607, the album server 110 determines whether the data received in step S606 is the data (e.g., image data and comment data) for creating the electronic album or an end-of-operation notice. If the received data is the data (e.g., image data and comment data) for creating the electronic album, the control flow proceeds to step S608, and if it is an end-of-operation notice, the album creating process is ended after storing the album data of the electronic album in the electronic album DB 210.

When the received data is determined in step S607 as being the data for creating the electronic album and the control flow proceeds to step S608, the album server 110 processes the received creation data in match with the entry areas of the template and inputs it in the template. For example, when the received creation data is image data, the image data is input in the template after being scaled up or down in accordance with the size of the image entry area designated by the user.

In step S609, the album server 110 transmits, to the user now creating the electronic album, display data for the template in which the creation data has been input in step S608. The control flow then returns to step S606. Thereafter, the album server 110 repeats the above-described steps S606 to S609.

Figure 7:
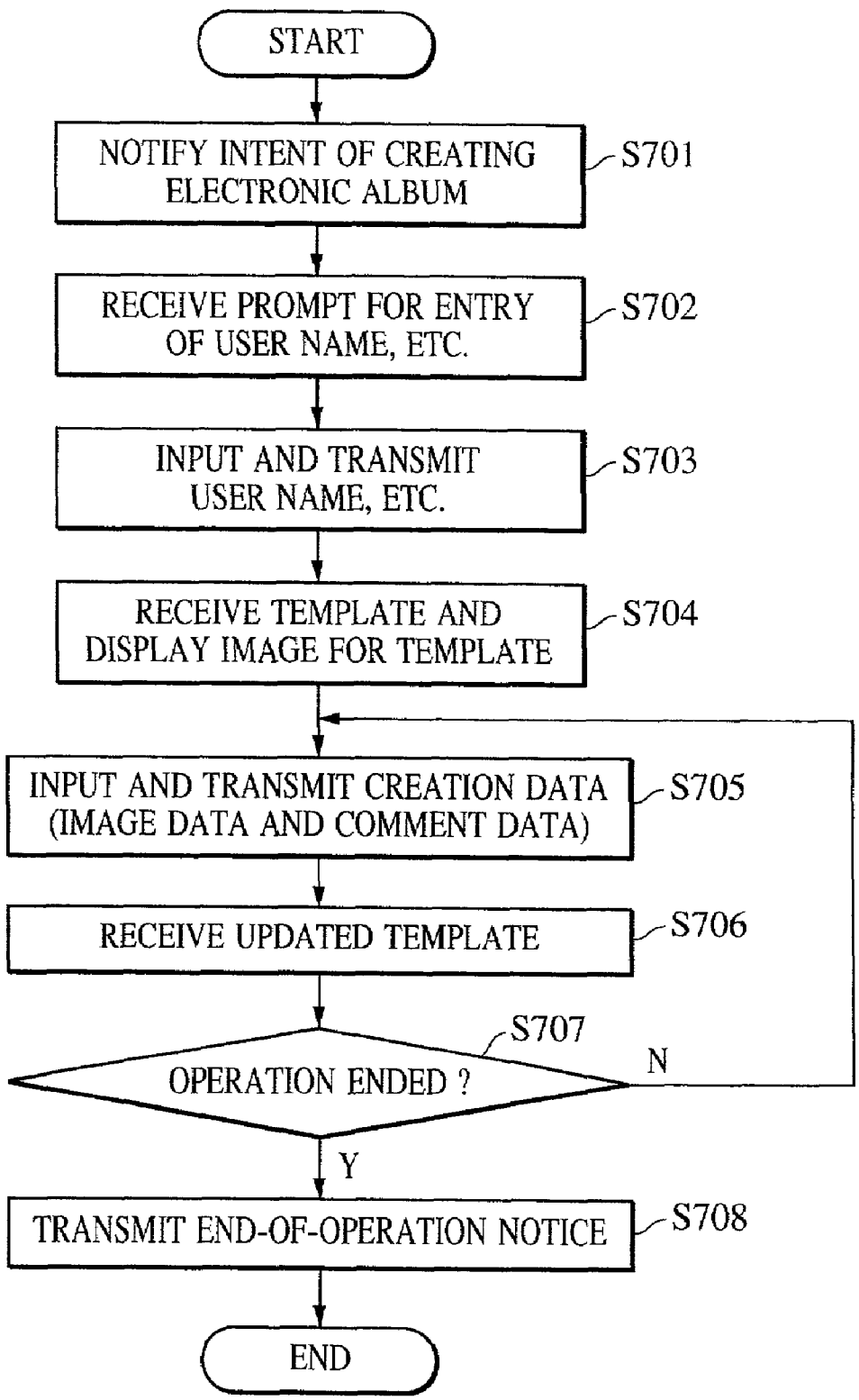
FIG. 7 is a flowchart showing the operation of an electronic album creating process by a creating user.

FIG. 7 is a flowchart showing the operation of an electronic album creating process by a creating user. FIG. 7 represents the operation on the side of one of the creating user computers 130-1 to 130-3.

Each of the creating user computers 130-1 to 130-3 accesses the Web site provided by the album server 110 for creating an electronic album, and notifies the intent of creating an electronic album to the album server 110 (step S701).

In response to the notification, the display data for prompting entry of the user name and the password is transmitted from the album server 110 to one of the creating user computers 130-1 to 130-3 that has accessed the Web site. In step S702, the one of the creating user computers 130-1 to 130-3 receives the display data for prompting entry of the user name and the password.

In step S703, the one of the creating user computers 130-1 to 130-3 displays, on the output device 307, a screen image based on the display data for prompting entry of the user name and the password. When the relevant user inputs the user name and the password using the input device 306, the one of the creating user computers 130-1 to 130-3 transmits the input user name and password to the album server 110.

The album server 110 then determines whether the user name and the password transmitted from the one of the creating user computers 130-1 to 130-3 match with those ones registered in the user information DB 209. If matched, the template information is provided, and if not matched, the album creating process ends.

As a response in the case where the transmitted user name and password match, the one of the creating user computers 130-1 to 130-3 receives in step S704 the display data for the template for creating an electronic album, which is provided from the album server 110, and displays a screen image based on the received template display data on the output device 307. In the screen image, the whole of a template is displayed such that the user easily recognizes the image entry area, the comment entry area, etc. Also, when any image data or comment data has already been input, the template is displayed with the image data or comment data input therein.

On that occasion, when another user of the first creating group 130 is under the operation of creating the electronic album, the album server 110 transmits display data for a communication screen enabling the users now creating the electronic album to make a chat or the like between or among them. Thereafter, the relevant users of the creating user computers 130-1 to 130-3 can progress the operation of creating the electronic album while communicating information with each other. For example, when the image data has already been input, they can transmit opinions about that image data between or among them. As a result of the chat, an image showing a view of the sea may be changed to an image showing a view of the mountain.

On that occasion, the chat communications are stored in the external storage 204. Thus, communication data among a plurality of users is stored in the external storage 204 in correlation to the template. Also, as described above, when some user is going to participate in the chat, the user must access the album server based on the approval-of-use information. The approval-of-use information is different for each of the album creating users. When storing the chat communications in the external storage 204, therefore, it is possible to confirm what chat has been made among which members of the album creating users.

Further, by taking the chat communications out of the external storage 204, it is possible to confirm the album creating process later.

In step S705, the relevant user of the one of the creating user computers 130-1 to 130-3, to which the template display data has been provided, enters creation data (such as image data and comment data) to be input in the template by using the input device 306 and transmits the creation data to the album server 110.

The transmitted creation data (such as image data and comment data) is input in the template by the album server 110 after being scaled up or down in accordance with the size of the template. Then, display data for the template, in which the transmitted creation data (such as image data and comment data) has been input, is transmitted from the album server 110.

In step S706, similar to above step S704, the one of the creating user computers 130-1 to 130-3 receives the updated template information and displays a screen image of the received template information on the output device 307. Then, the control flow proceeds to step S707. In step S707, the one of the creating user computers 130-1 to 130-3 determines whether the intent of ending the operation is input from the user through the input device 306.

If the intent of ending the operation is not input, the one of the creating user computers 130-1 to 130-3 returns to step S705 and then repeats the above-described steps S705 to S707 of the album creating process. On the other hand, if the intent of ending the operation is input, the one of the creating user computers 130-1 to 130-3 goes to step S708 and transmits an end-of-operation notice to the album server 110, thereby ending the album creating process.

(Advertisement Inserting Process)

Figure 8:
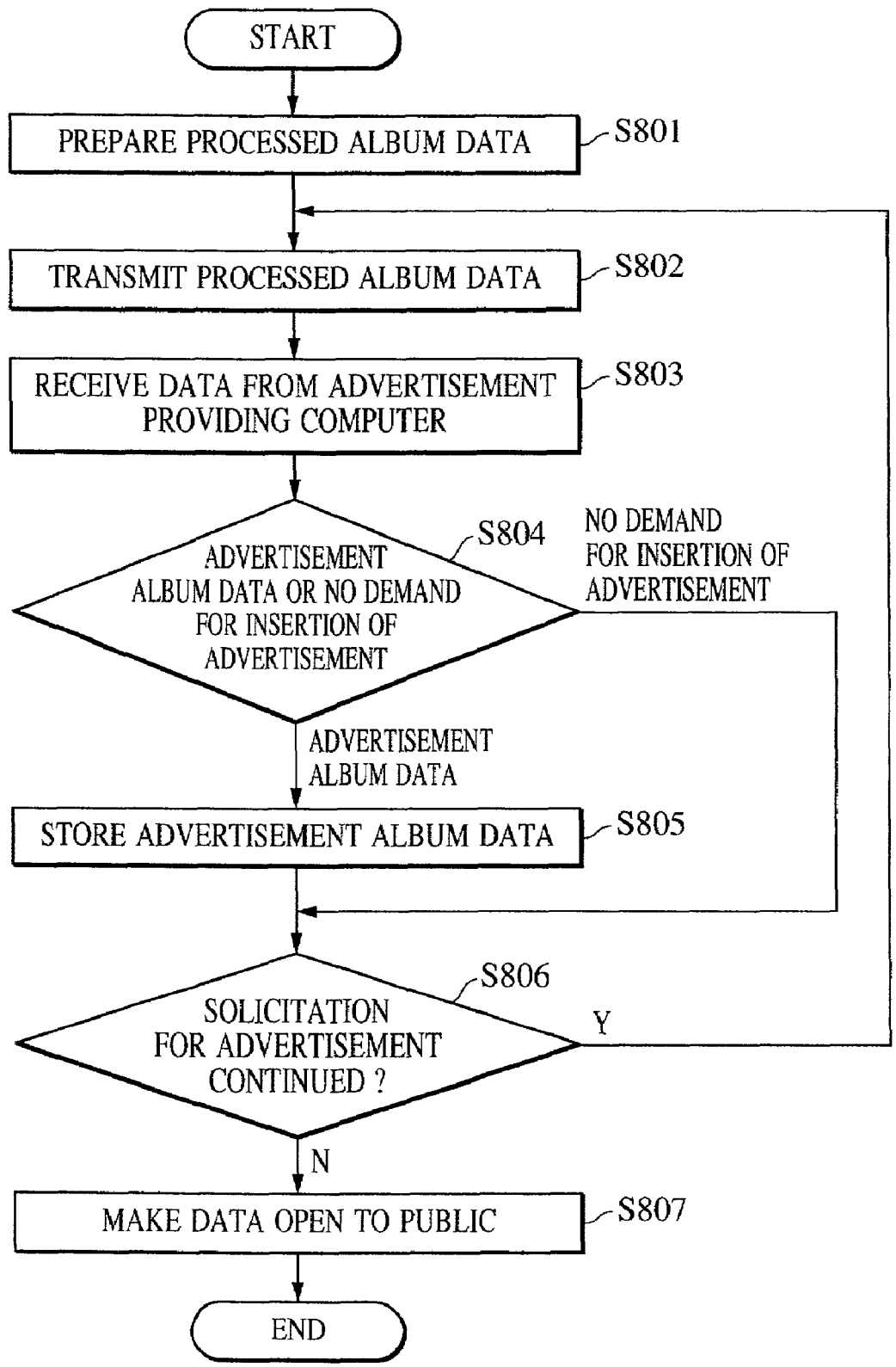
FIG. 8 is a flowchart showing the operation of a process for inserting an advertisement in the electronic album.

FIG. 8 is a flowchart showing the operation of a process for inserting an advertisement in the electronic album. FIG. 8 represents the operation on the side of the album server 110.

First, the album server 110 prepares processed album data by processing the album data of the electronic album which has been created and stored in the electronic album DB 210 (step S801). The processing of the album data is made by converting the album data into the more easily available form. Namely, the album data is converted into such data as allowing an advertisement providing company A to make a judgment whether the electronic album is suitable for insertion of an advertisement. Herein, when there are plural sets of album data belonging to one category, those data are collected for each category by the conversion. For example, assuming that the category information is "travel" and the sub-category information is "Canada", the album data including "Canada" in the theme information are correlated to each other. Such processing enables the company A to easily select the album in which an advertisement is to be inserted. Incidentally, the processed album data is prepared from the album data of the electronic album belonging to the category information that is going to be made open to the public on the Web site.

Then, in step S802, the album server 110 transmits the processed album data to the advertisement providing computers 140, 141, etc. operated by users in companies who demand insertion of advertisements. It is here assumed, for example, that the processed album data is transmitted to the advertisement providing computer 140 of the company A.

When the album server 110 receives in step S803 data from the advertisement providing computer 140 as a response to the transmission of the processed album data, it goes to step S804. In step S804, the album server 110 determines whether the data received in step S803 is advertisement album data, which is prepared by inputting an advertisement, to be inserted in the electronic album, in the processed album data transmitted to the advertisement providing computer 140, or a notice of indicating no demand for insertion of advertisements.

If it is determined that the received data is the advertisement album data, the control flow proceeds to step S805. If it is determined that the received data is the notice of indicating no demand for insertion of advertisements, the control flow proceeds to step S806.

In step S805, the album server 110 stores the received advertisement album data in the electronic album DB 210 and then goes to step S806.

In step S806, the album server 110 determines whether solicitation for advertisements is to be continued. That determination is made based on, for example, whether there is the processed album data in which an advertisement is not yet inserted, and whether there is another user, e.g., a company, who demands insertion of an advertisement.

If it is determined that the solicitation for advertisements is to be continued, the album server 110 returns to step S802 and repeats the above-described steps S802 to S806 for the advertisement providing computer 141 of the company B, for example. Note that, when continuing the solicitation for advertisements, the processed album data is transmitted to the advertisement providing computer 141 after removing, from it, the processed album data that has been used to prepare the advertisement album data stored in above step S805.

If it is determined that the solicitation for advertisements is not to be continued, the album server 110 goes to step S807 and makes the advertisement album data, which has been stored in the electronic album DB 210, available for general use (S808). This step of making the advertisement album data available for general use is performed depending on the category information of the electronic album.

Thereafter, general users operating the general user computers 150, 151, etc. are able to access the Web site, provided by the album server 110, through the general user computers 150, 151, etc., and to browse the images of the advertisement album data. In this connection, the album server 110 may arrange a contest, for example, and offer premiums to one or more creating users of the electronic albums, which gained prizes, from the advertising companies and so on. Stated otherwise, a step of selecting certain electronic album data for prizes may be added to increase an incentive to the creation of electronic albums. After making the advertisement album data open to the public, the advertisement inserting process ends.

Figure 9:
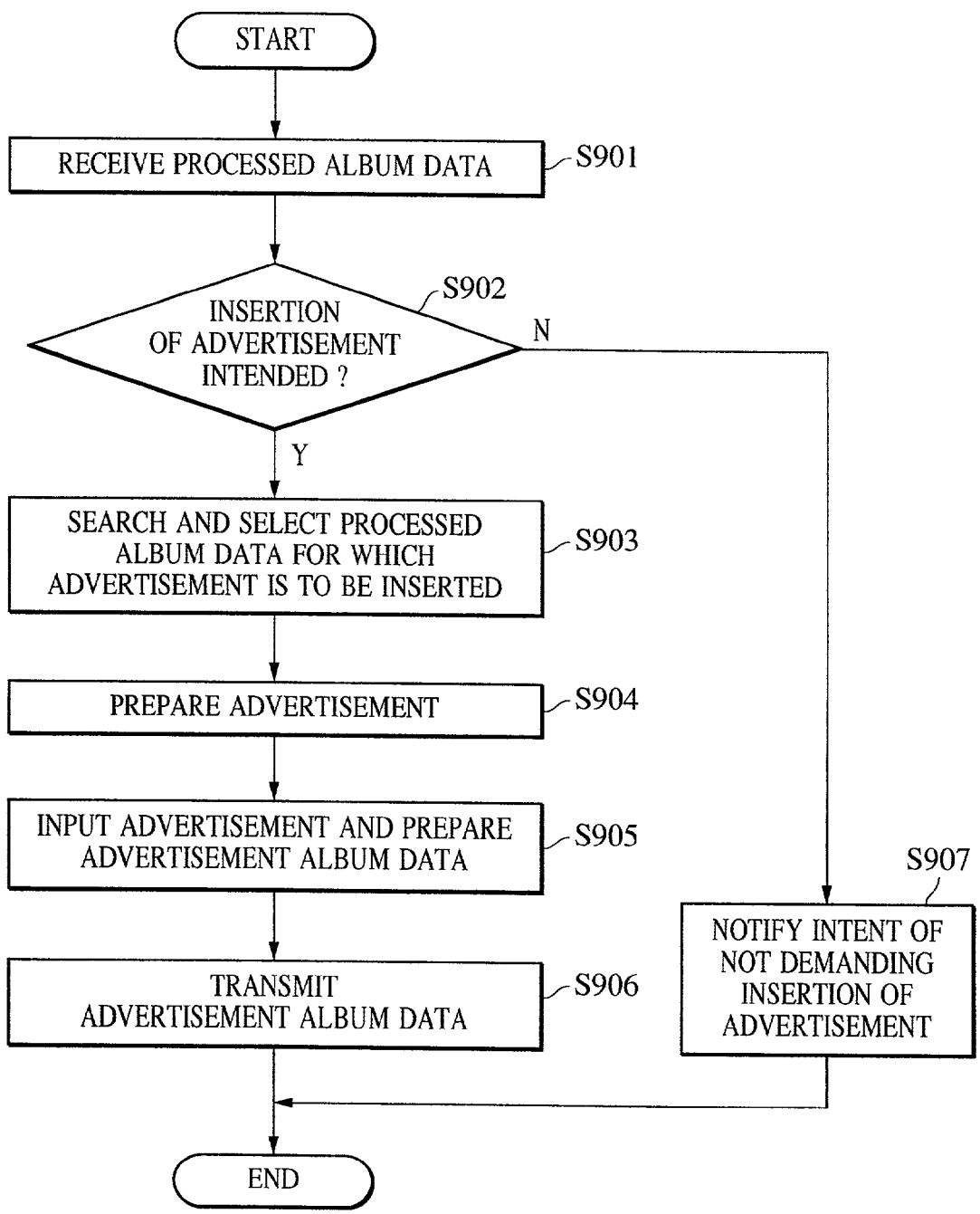
FIG. 9 is a flowchart showing the operation of a process for inserting an advertisement in the electronic album.

FIG. 9 is a flowchart showing the operation of a process for inserting an advertisement in the electronic album. FIG. 9 represents the operation on the side of the advertisement providing computers 140, 141, etc. Also, in the following description of FIG. 9, it is assumed that the advertisement providing computer 140 of the company A executes the operation of the advertisement inserting process ends.

First, the advertisement providing computer 140 receives the processed album data transmitted from the album server 110 (step S901).

Then, in step S902, the advertisement providing computer 140 displays, on the output device 307, images of the processed album data received in above step S901. The company A, i.e., the user of the advertisement providing computer 140, reviews the image displayed on the output device 307, and determines whether to demand insertion of an advertisement in any of the images of the processed album data. The company A then enters a determination result using the input device 306.

If an advertisement is to be inserted, the control flow proceeds to step S903. On the other hand, if an advertisement is not to be inserted, the control flow proceeds to step S907. In the latter case, the company A, i.e., the user of the advertisement providing computer 140, notifies the intent of not demanding insertion of an advertisement to the album server 110, thereby ending the advertisement inserting process.

In step S903, the advertisement providing computer 140 searches and selects the processed album data, for which an advertisement is to be inserted, in accordance with an instruction from the user, i.e., the company A. Then, in step S904, the advertisement providing computer 140 prepares advertisement data to be attached to the processed album data selected in above S903. The advertisement data to be attached to the processed album data may be prepared in advance.

Then, in step S905, the advertisement providing computer 140 inputs the advertisement data, which has been prepared in above step S904, in the processed album data that has been selected in above step S903. As a result, the advertisement providing computer 140 prepares advertisement album data in a combination of the processed album data and the advertisement data.

In step S906, the advertisement providing computer 140 transmits the prepared advertisement album data to the album server 110, thereby ending the advertisement inserting process.

With this embodiment, as described above in detail, the album server 110 receives the user information regarding the album creating users transmitted from the creating user computer 130-1, and based on the received user information, it provides a template for creating an electronic album to the creating user computers 130-1 to 130-3. Then, the album server 110 receives, via the network 120, creation data (such as image data and comment data) to be input in the template that has been transmitted from the creating user computers 130-1 to 130-3, and inputs the received creation data in the template after processing it in accordance with respective entry areas of the template.

Thus, the album creating users operating the creating user computers 130-1 to 130-3 can transmit the creation data (such as image data and comment data), which is to be input in the template, through the creating user computers 130-1 to 130-3 and the network 120. Accordingly, the album creating users can create a common electronic album in cooperation without meeting at a certain place for editing of the album.

Also, the album server 110 stores category information for classifying electronic albums in the category DB 208, provides the category information to the creating user computer 130-1, and receives category selection information transmitted from the creating user computer 130-1 as a response to presentation of the category information. Then, in accordance with the received category selection information, the album server 110 provides the template to the creating user computers 130-1 to 130-3. Therefore, the template suitable for the category information selected by the album creating user can be provided to the creating user computers 130-1 to 130-3.

Further, the album server 110 receives communication information transmitted from any of the creating user computers 130-1 to 130-3, and then transmits the received communication information to all of the creating user computers 130-1 to 130-3. This enables the album creating users operating the creating user computers 130-1 to 130-3 to perform the operation of creating an electronic album while communicating with one another through a chat or the like.

Since the communication information is stored in the album server 110, the album storing users can review the stored communication information later. In this respect, the communication information is stored in correlation to approval-of-use information specific to the individual users. It is therefore possible to know, for example, the process in which an image has been replaced, i.e., who has uttered the opinion to replace an image among the album creating users. That feature is effective in the case where there occurs a discrepancy between opinions of the users after the album has been completed or when it is closely completed, because of enabling the users to confirm the proceeding of the communications later.

Moreover, upon receiving the creation data (such as image data and comment data), which is to be input in the template, from the creating user computers 130-1 to 130-3, the album server 110 provides, to the creating user computers 130-1 to 130-3, the template in which the received creation data has been input. Therefore, even when the creation data is transmitted from any one of the creating user computers 130-1 to 130-3, the updated latest template can be provided to all of the creating user computers 130-1 to 130-3.

In this embodiment, a plurality of templates are prepared for each item of the category information and stored in the album server 110. Instead of preparing a plurality of templates for each item of the category information, however, a plurality of prepared templates may be shared by plural items of the category information.

Alternatively, one template may be prepared for each item of the category information. In this case, when the host user selects the category information through the creating user computer, the template for creating an electronic album is automatically decided.

While, in the advertisement inserting process of this embodiment shown in FIGS. 8 and 9, the processed album data prepared by processing the album data of the electronic album is transmitted to one of the advertisement providing computers at a time for solicitation of advertisements, the processed album data may be simultaneously transmitted to all of the advertisement providing computers. In such a case, if a plurality of advertisement providing computers demand insertion of advertisements for the same processed album data, the album server 110 may decide one user, who can insert an advertisement for that processed album data, in accordance with a predetermined rule such as deciding the advertising user in the order of higher advertisement charges proposed by bidding users.

(Other Embodiments of Present Invention)

The scope of the present invention involves an embodiment that is implemented by supplying, to a computer in a system or apparatus connected to various devices, program codes of software for realizing the functions of the above-described embodiment, and by causing the various devices in accordance with the program codes stored in the computer (CPU and/or MPU) in the system or apparatus so that the various devices operate to achieve the functions of the above-described embodiment. In such a case, the program codes serve in themselves to realize the functions of the above-described embodiment. Hence, the program codes per se and means for supplying the program codes to the computer, e.g., a storage medium storing the program code, constitute the present invention. Storage mediums for storing the program codes may be, e.g., floppy disks, hard disks, optical disks, magneto-optical disks, CD-ROMs, magnetic tapes, nonvolatile memory cards, and ROMs.

Also, it is needless to say that the functions of the above-described embodiment are realized by not only a computer executing the program codes supplied to it, but also an OS (Operating System), another application software or the like which is working on the computer and realizes the functions of the above-described embodiment in cooperation with program codes. These program codes are also involved within the scope of the present invention.

Further, as a matter of course, the present invention involves such a case in which the supplied program codes are stored in a memory provided in a function add-on board mounted in the computer or a function add-on unit connected to the computer, and a CPU or the like incorporated in the function add-on board or unit executes part or whole of the actual processing in accordance with instructions from the program codes, thereby realizing the functions of the above-described embodiment.

According to the embodiment described above, the album server receives the user information regarding a plurality of album creating users input from one of them, and based on the received user information, it transmits, to the plurality of album creating users, approval-of-use information for accessing the Web site to create an electronic album. Also, the album server provides information to the plurality of album creating users to which the approval-of-use information has been transmitted. Then, the album server receives creation information that is related to images to be input in the template information and has been entered from the plurality of album creating users through user terminals, and then edits the images based on the template information. As a result, the plurality of album creating users can enter the creation information, which is to be input in the template information, through the user terminals operated by the individual album creating users, and can create a common electronic album in cooperation without meeting at a certain place for editing of the album.

Also, the album server provides, to the album creating user side, category information for classifying electronic albums, and receives category selection information input from the album creating user side as a response to presentation of the category information. Then, in accordance with the received category selection information, the album server provides template information. Therefore, the template information suitable for the selected category information can be provided to the album creating users.

Further, the album server receives communication information input from any of the album creating users, and then transmits the received communication information to all of the album creating users. This enables the album creating users to create an electronic album while communicating with one another.

The advertisement providing side conventionally inserts an advertisement by estimating persons who are going to view the advertisement, but not confirming personalities, etc. of the viewers. Therefore, advertisement charges are often paid in spite of the advertising effect being unknown. Such a situation can be advantageously coped with by the embodiment. The embodiment makes it possible to provide an efficient and effective advertising method when putting advertisements on home pages, while enabling an electronic album to be provided inexpensively.

As many apparently widely different embodiments of the present invention can be made without departing from the spirit and scope thereof, it is to be understood that the invention is not limited to the specific embodiments thereof except as defined in the claims.

What is claimed is:

1. An online output system having a user terminal connected to an electronic album managing apparatus and an advertisement providing apparatus via a network, wherein the electronic album managing apparatus which communicates with a plurality of user terminals, comprises:

an image receiving unit that receives album data from one of the plurality of user terminals; and a first transmitting unit that transmits the received album data to the advertisement providing apparatus, wherein the advertisement providing apparatus comprises:

a displaying unit that displays the album data transmitted by said first transmitting unit;

an instruction inputting unit that inputs an instruction, based on a user operation, indicating whether or not a demand is made for insertion of advertisement data into the transmitted album data after said display unit displays the album data;

a searching unit that searches for advertisement data to be inserted into the album data, when the input instruction indicates that a demand is made for the insertion of the advertisement data into the album data;

an advertisement album data creating unit that creates advertisement album data by inserting the searched advertisement data into the received album data; and a second transmitting unit that transmits the created advertisement album data to the electronic album managing apparatus, and wherein the electronic album managing apparatus further comprises:

a publication unit that publishes the advertisement album data transmitted by said second transmitting unit, to the user terminal.

2. A system according to claim 1, wherein the advertisement providing apparatus further comprises a notifying unit that notifies the electronic album managing apparatus when it is instructed that a demand is not made for the insertion of the advertisement data into the album data by the instruction inputting unit.

3. A system according to claim 1, wherein the album data is any one of image data, template data or comment data.

* * * * *